Jan. 19, 1960

G. W. HEUER ET AL 2,922,113

ELECTRORESPONSIVE DEVICE

Filed Nov. 2, 1956

WITNESSES
Edwin E. Basler
Wm. B. Sellers.

INVENTORS
George W. Heuer &
William S. Brink
BY
David M. Schiller
ATTORNEY

United States Patent Office

2,922,113
Patented Jan. 19, 1960

2,922,113

ELECTRORESPONSIVE DEVICE

George W. Heuer, Morristown, and William S. Brink, Irvington, N.J., assignors to Westinghouse Electric Corporation, East Pittsburgh, Pa., a corporation of Pennsylvania Application November 2, 1956, Serial No. 619,977

6 Claims. (Cl. 324—137)

This invention relates to electroresponsive devices, and has particular relation to an insulating device for insulating electrical conductors of an electroresponsive device.

Although the invention has many and varied uses, it will be described in connection with electroresponsive devices such as electrical watthour meters. Watthour meters have previously been constructed which include a magnetic structure having a voltage magnetic pole and a pair of spaced current magnetic poles spaced from the voltage pole to define an air gap. The meter further includes a plurality of electrical conductors in the form of a voltage winding for the voltage pole and a pair of current windings for the current poles which are effective when energized by alternating quantities to establish voltage and current fluxes cooperating to produce a shifting field in the air gap. A suitable electroconductive armature is mounted for rotation relative to the magnetic structure through the air gap under the influence of the shifting field.

Recently, it has been the practice to mold bare current coils to the current poles by a suitable molding operation. Such molding operations ordinarily involve the application of substantial pressures to the molding material. As a result of these pressures a number of problems have been encountered in such molding operations. For example, when a pair of bare current coils are employed, difficulty has been experienced in maintaining proper spacing of the bare coils during the molding operation. As a consequence molded current coil assemblies have been formed with portions of the two coils in direct contact, or in such close proximity that the insulation therebetween provided by the molding material is insufficient to prevent an insulation breakdown under energized conditions.

According to the present invention an improved insulating device of one-part construction is provided for insulating electrical conductors. The device is further designed to engage a plurality of spaced conductors for maintaining the spacing of the engaged conductors.

In a preferred embodiment of the invention, a watthour meter is provided which includes a magnetic structure formed of separate laminated voltage and current magnetic parts. The current part includes a pair of spaced parallel current poles having pole faces positioned in a common plane. The voltage magnetic part includes a voltage pole and is arranged for securement to the current part subsequent to complete assembly of the current part such that the voltage pole face defines a plane which is spaced from the parallel to the plane of the current pole faces to provide an air gap.

A pair of preformed current windings are preferably provided to surround the current poles. Each of the windings is constructed of rigid, self-supporting, deformable electroconductive wire which is deformed to provide windings of figure-of-eight configuration each having a pair of loops between the coil terminals with the loops lying in a common plane. The loops of each winding are joined by a central bar section consisting of two parallel adjacent winding portions which lie in the plane of the loops. Each winding is positioned relative to the current part with a separate winding loop surrounding each current pole such that the loops of the windings lie in a pair of spaced parallel planes transverse to the plane of the current part. With this arrangement the four winding portions which constitute the central bar sections of the windings are located in the space between the current poles to extend along spaced parallel lines transverse to the plane of the current part.

According to the present invention the four winding portions are supported in the proper spaced positions such that displacement of the winding portions relative to one another during the molding operation is effectively prevented. For this purpose an insulating spacer device is provided which comprises an insulating body formed with a plurality of spaced parallel openings each extending entirely through the body to receive a separate one of the winding portions which are located between the current poles. In order to facilitate the installation of the spacer relative to the winding portions the body is formed with peripheral slots extending substantially parallel to and communicating with the openings through which the winding portions may be passed for positioning within the openings.

It is, therefore, an object of the invention to provide an improved insulating device for insulating electrical conductors.

It is another object of the invention to provide an improved insulating spacer device for maintaining a desired spacing between a plurality of electrical conductors.

It is a further object of the invention to provide an electroresponsive device of improved construction.

It is another object of the invention to provide an improved method of molding a pair of preformed current windings to a current magnetic part of a watthour meter.

It is still another object of the invention to provide an improved method of molding a pair of preformed current windings to the current poles of a current magnetic part of a watthour meter wherein portions of the windings located in the space between the current poles are supported against displacement relative to one another during the molding operation.

Other objects will become apparent from the following description taken in conjunction with the accompanying drawings, in which:

Fig. 5 is a view in bottom plan of the upper mold part of the mold assembly employed in the construction of the meter of Fig. 1.

Figure 1:
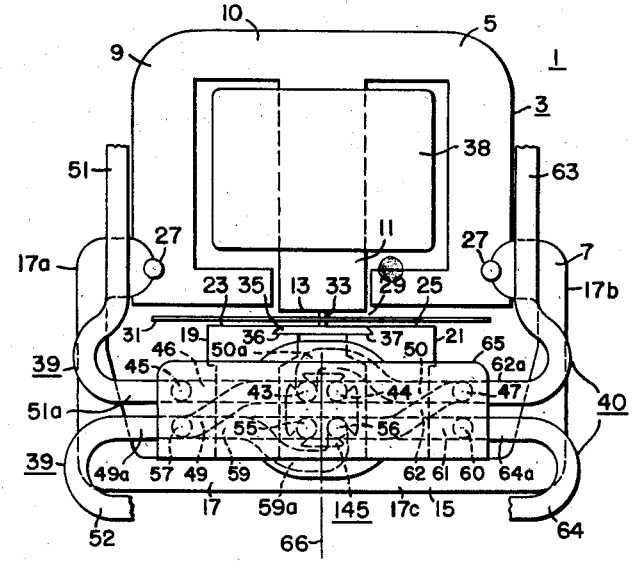
Figure 1 is a view in rear elevation of a watthour meter embodying the teachings of the invention.

Referring to the drawings, there is illustrated in Fig. 1 an electroresponsive device represented generally by the numeral 1 embodying the teachings of the present invention. Although the invention may be employed in connection with various devices, it is assumed for purposes of description that the device 1 is an electrical watthour meter of the type utilized for measuring the energy of single phase, three-wire electrical circuits operating at a frequency of sixty cycles per second.

The meter 1 includes a magnetic structure 3 which is preferably of multi-part formation. As shown in Fig. 1, the structure 3 includes a voltage magnetic part 5 and a current magnetic part 7. The voltage part 5 is preferably formed of a plurality of magnetic laminations 9 each having the configuration shown in Fig. 1 stacked in a direction transverse to the plane of the paper. The voltage part 5 is of substantially E-shaped configuration with an outer rim 10 having a voltage magnetic pole 11 projecting therefrom which includes a pole face 13.

The current magnetic part 7 is preferably formed of a plurality of magnetic laminations 15 each having the configuration illustrated in Fig. 1 stacked in a direction which is transverse to the plane of the paper. As shown, the current part 7 includes a rim 17 of substantially U-shaped configuration having a pair of spaced arms 17a and 17b connected by a base 17c. The part 7 includes further a pair of spaced current poles 19 and 21 projecting from the base 17c along parallel lines. It is observed that the poles 19 and 21 have respectively pole faces 23 and 25 located substantially in a common plane. The parts 5 and 7 may be secured together in any suitable manner such as by rivets 27 which extend through openings of the parts 5 and 7 which are formed by engaging surfaces of such parts. It is observed that the parts 5 and 7 are secured together with the plane of the pole faces 23 and 25 spaced from and parallel to the plane of the pole face 13 to define an air gap 29.

The meter 1 includes further an electroconductive armature preferably in the form of a disc 31 which is mounted for rotation by a shaft 33 through the air gap 29 relative to the structure 3. In order to provide overload compensation, as is understood in the art, a suitable magnetic shunt device 35 is positioned between the current poles 19 and 21. For this purpose the poles 19 and 21 have respectively slots 36 and 37 which extend in planes transverse to the planes of the laminations 15 for receiving the shunt device 35.

In order to permit energization of the meter 1 for effecting rotation of the disc 31 in accordance with energy of an electrical energizing circuit (not shown), a plurality of energizable windings for the several poles 11, 19 and 21 are provided. For this purpose, a voltage winding 38 surrounds the voltage pole 11 which preferably includes a large number of turns of small cross section electroconductive wire. The winding 38 is arranged for energization in accordance with voltage of the circuit (not shown) to produce an alternating voltage magnetic flux.

Figure 3:
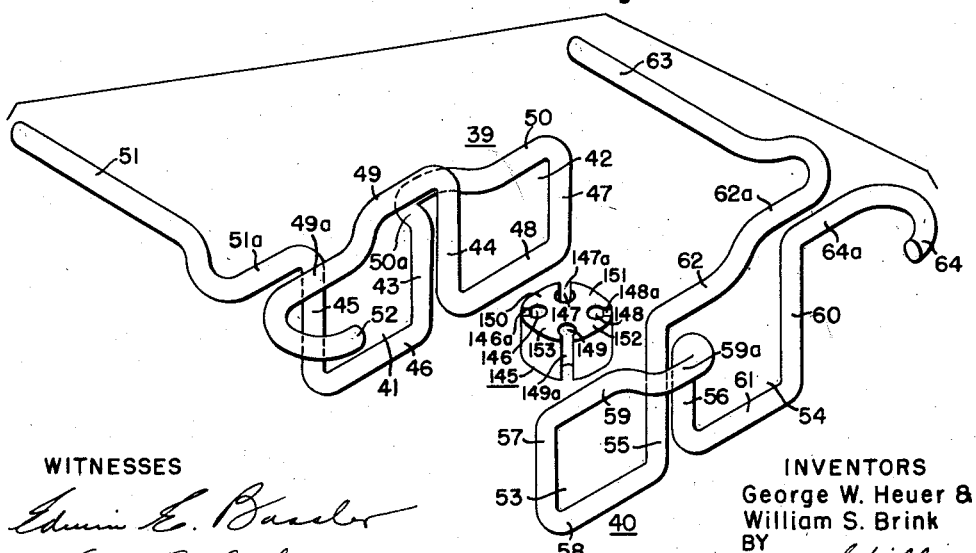
Fig. 3 is a view in perspective of a pair of current windings with a spacer for the meter of Fig. 1.

A pair of current windings 39 and 40 each having the configuration illustrated in Fig. 3 are provided to surround the current poles 19 and 21. The windings 39 and 40 are arranged for energization in accordance with currents of the circuit (not shown) to produce alternating current magnetic fluxes which cooperate with the voltage magnetic flux to establish a shifting magnetic field in the air gap 29. As is understood in the art, the shifting field so established effects rotation of the disc 31 relative to the structure 3 in accordance with energy of the circuit (not shown). The windings 39 and 40 may be arranged to permit the measurement of energy of single phase, three-wire circuits with each winding energizable in accordance with current of a separate wire of the circuit (not shown).

As illustrated in Fig. 3 each of the windings 39 and 40 is constructed to have a substantially figure-of-eight configuration. The windings are preferably formed of rigid, self-supporting, deformable electroconductive wire, such as copper, of circular cross-sectional area. However, the wire may have other configurations, such as a rectangular cross section. In order to construct the winding 39 a suitable length of bare wire is deformed to provide a winding of figure-of-eight configuration having a pair of loops defining openings 41 and 42 joined by a central bar section consisting of spaced parallel winding portions 43 and 44 which lie in a common plane. The winding 39 further includes a side portion 45 and a linking portion 46 which with the portion 43 define the opening 41. It is observed that the winding portions 45 and 46 lie in the plane defined by the winding portions 43 and 44. The opening 42 is defined by a side portion 47, a linking portion 48 and the portion 44 with the portions 47 and 48 lying in the plane of the portions 43 and 44. The openings 41 and 42 are effectively closed by a winding portion 9 and a linking portion 50 respectively which include parts 49a and 50a displaced from the plane of the winding to clear the winding portions 45 and 44. It is observed that the winding 39 includes terminal portions 51 and 52 which are located at one end of the winding spaced in a direction transverse to the plane of the winding. The terminals 51 and 52 are connected to the loops 41 and 42 by connecting portions 51a and 49a which define a plane transverse to the plane of the loops.

The winding 40 is of the same general figure-of-eight configuration as the winding 39 but is shaped to satisfy space and connection requirements of the meter when the windings are operatively positioned. As shown in Fig. 3 the winding 40 includes a pair of loops defining openings 53 and 54 joined by a central bar section formed of spaced parallel winding portions 55 and 56. The winding 40 also includes transverse portions 57 and 58 which with the portion 55 define the opening 53. The opening 53 is effectively closed by a winding portion 59 which includes a part 59a displaced from the plane of the winding to clear the winding portion 55. The opening 54 is formed by the winding portions 56, 60, 61 and 62 with the portion 62 having a part 62a which is displaced from the plane of the winding to clear the winding portion 60. The winding 40 includes terminal portions 63 and 64 which are connected respectively to the loops 53 and 54 by portions 62a and 64a which define a plane transverse to the plane of the loops. The terminals are located at one end of the winding spaced in a direction transverse to the plane of the winding.

Figure 2:
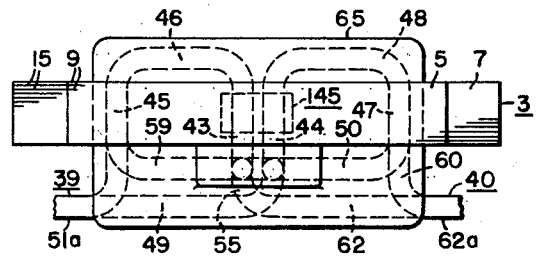
Fig. 2 is a view in top plan of the meter of Fig. 1 with parts removed.

The windings 39 and 40 are positioned relative to the poles 19 and 21 in the manner best shown in Figs. 1 and 2. As there shown the winding 40 is initially located to surround the poles 19 and 21 such that the poles 19 and 21 extend respectively through the openings 53 and 54 of the winding. The winding 40 is further positioned with the terminals 63 and 64 located at the rear side of the structure 3 adjacent the right-hand end of the structure 3 as viewed in Fig. 1. The coil 39 is positioned above the coil 40 with the poles 19 and 21 extending respectively through the openings 41 and 42 to have the terminals 51 and 52 located at the rear side of the structure 3 adjacent the left-hand side of the structure 3 as viewed in Fig. 1. With this arrangement the windings 39 and 40 are positioned in spaced parallel planes transverse to the plane of the structure 3.

As shown in Fig. 3 the windings 39 and 40 are proportioned such that the portion 49a of the winding 39 may be positioned in front of the portion 59 of the winding 40 in the plane of the winding 40 as viewed in Fig. 1. The windings are further designed so that the portion 50 of the winding 39 may be positioned behind the portion 62a of the winding 40 in the plane of the winding 40 as viewed in Fig. 1. With such positioning of the windings it is noted that the winding portions 43, 44, 55 and 56 which form the central bar sections of the windings are located in the space between the current poles 19 and 21 in spaced parallel relation to extend transverse to the plane of the part 7. These winding portions are preferably positioned symmetrically with respect to the axis of symmetry 66 of the current part 7 to prevent rotation of the disc 31 under conditions when only the voltage winding 38 is energized.

The windings are preferably embedded in a suitable insulating body or casing 65 with the portions 51a and 62a of the windings emerging from the body 65 along a common line which is spaced from and parallel to a common line along which the portions 49a and 64a of the windings emerge from the casing 65. These lines of emergence lie in a common plane which is spaced from and parallel to the plane of the structure 3. The casing 65 is preferably molded about the windings by a molding process wherein a mold assembly of the form illustrated in Figs. 4 through 8 is conveniently employed.

As there shown, a mold assembly is provided which includes two parts 75 and 77 designated hereinafter respectively as upper and lower mold parts. The lower mold part 77 is illustrated in Figs. 4, 5, 7 and 8 as including a base surface 79 having a central raised section 81 which includes a cavity 82 extending into the base surface 79 as shown in Figs. 5 and 8. The raised section 81 further includes a cavity 84 having a side wall 85 and an end wall defined by the surface 79. It is observed that the cavity 82 communicates with the cavity 84 and forms a part of a composite mold cavity when the parts 75 and 77 are in a closed condition as will appear hereinafter.

The raised section 81 includes a pair of spaced leg portions 86 and 87 which form side walls for the cavity 82. The leg portions 86 and 87 are provided with a plurality of spaced grooves for the purpose of receiving portions of the windings 39 and 40 to assist in supporting such windings during the molding operation. For this purpose, the leg portion 86 includes a pair of spaced grooves 89 and 91 for receiving respectively the portions 51a and 49a of the coil 39, whereas the leg portion 87 includes spaced grooves 93 and 95 for receiving respectively the portions 62a and 64a of the coil 40.

Figure 4:
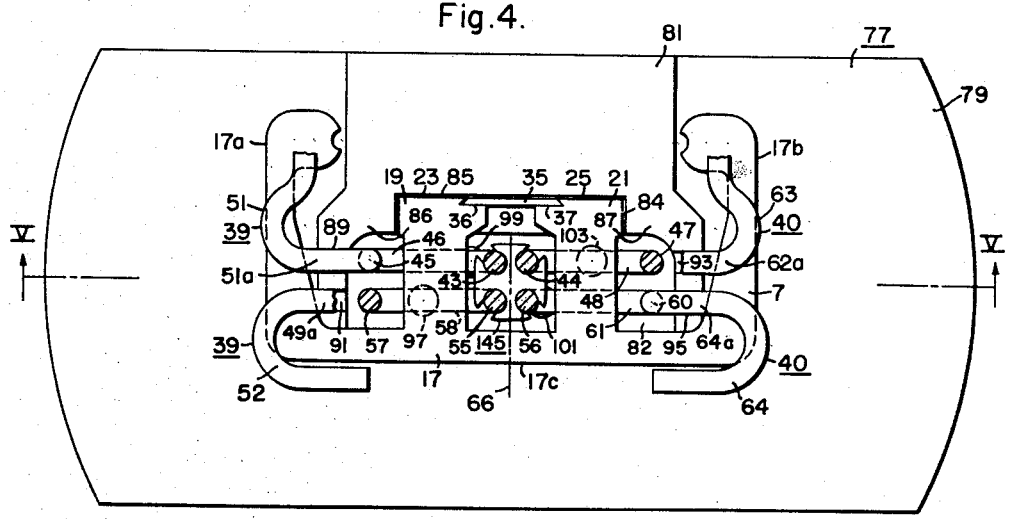
Fig. 4 is a view in top plan of the lower mold part of a two-part mold assembly employed in the construction of the meter of Fig. 1.
Figure 5:
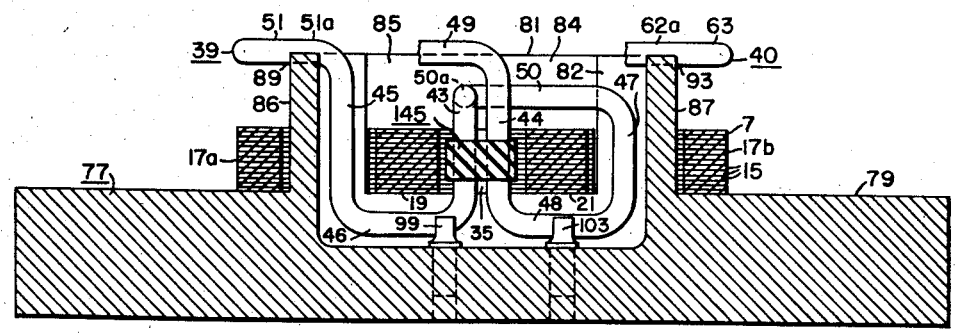
Fig. 5 is a view in section taken along the line V—V of Fig. 4.

As shown in Figs. 4 and 5, the lower mold part 77 includes a plurality of slotted support pins 97, 99, 101 and 103 positioned within openings of the part 77 to project into the cavity 82 for the purpose of further assisting in supporting the windings in proper positions during the molding process. To this end, the pins 99 and 103 are positioned to receive respectively the portions 46 and 48 of the coil 39, whereas the pins 97 and 101 are positioned respectively to receive the portions 58 and 61 of the winding 40 when the windings are properly positioned relative to the mold part 77.

Figure 6:
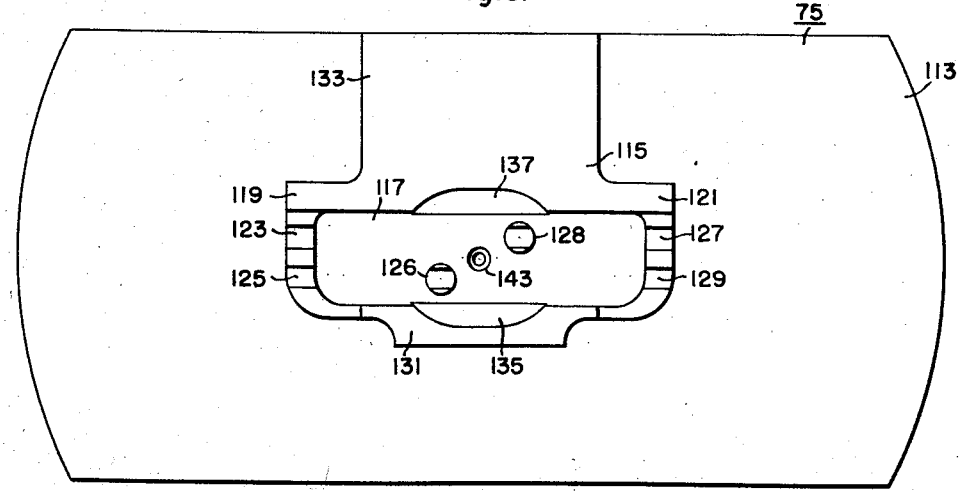
Figure 7:
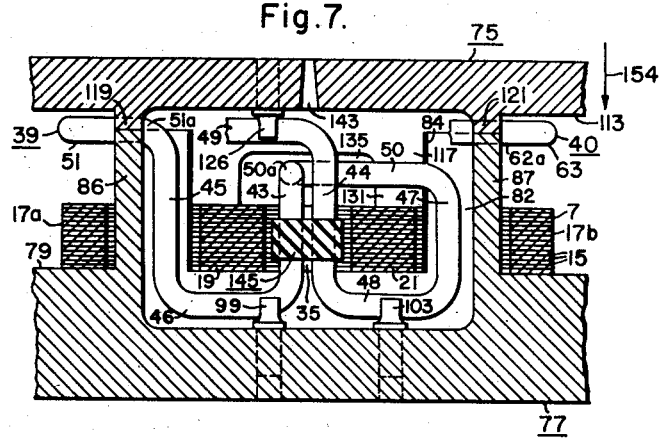
Figs. 7 and 8 are views in section showing the parts of Figs. 4 and 6 in operative positions.
Figure 8:
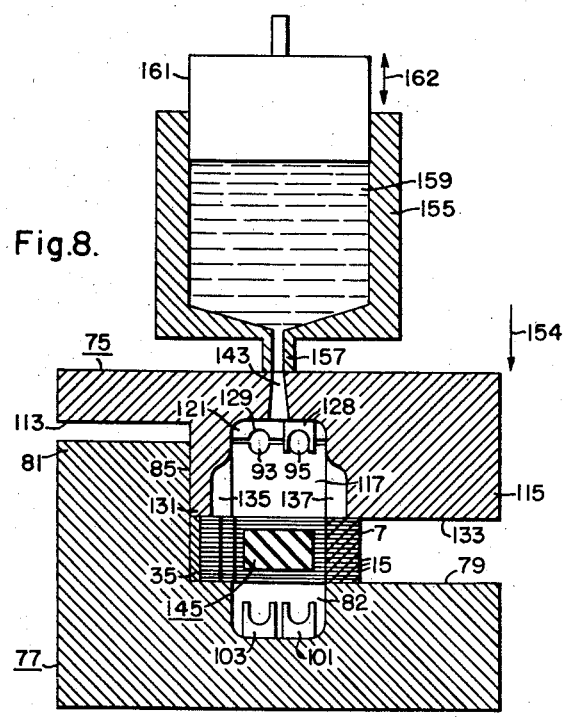

Details of construction of the upper mold part 75 are illustrated in Figs. 6, 7, and 8. As there shown, the part 75 includes a base surface 113 having a central raised section 115 which includes a cavity 117. As will presently appear, the cavity 117 forms with the cavity 82 of the part 77 a composite mold cavity when the parts 75 and 77 are in a closed condition. The section 115 includes a pair of spaced leg portions 119 and 121 which define side walls for the cavity 117. The leg portions 119 and 121 are positioned to engage respectively the leg portions 86 and 87 of the part 77 when the parts 75 and 77 are in a closed condition.

For this purpose, the leg portion 119 includes spaced grooves 123 and 125 to receive respectively the portions 49a and 51a of the coil 39 when the mold parts are in the closed condition. In a similar manner, the leg portion 121 includes spaced grooves 127 and 129 for receiving respectively the portions 64a and 62a of the winding 40 when the mold parts are in such closed condition. The mold part 75 further includes a pair of slotted support pins 126 and 128 positioned within openings of the part 75 to extend into the cavity 117 for receiving respectively the portion 49 of the winding 39 and the portion 62 of the winding 40 when the mold parts are in the closed condition.

It is observed that the section 115 includes portions 131 and 133 spaced by the cavity 117 which have surfaces positioned in a common plane spaced from the common plane defined by the surfaces of the leg portions 119 and 121. The portions 131 and 133 include respectively opposed pockets 135 and 137 which open toward each other to communicate with the cavity 117. The pockets 135 and 137 are proportioned to receive respectively the displaced portion 50a of the winding 39 and the displaced portion 59a of the winding 40 when the mold assembly is in a closed condition. It is further observed that the mold part 75 includes an opening 143 communicating with the cavity 117 through which the molding material 65 is introduced.

In the past a number of difficulties have been encountered in the molding of current windings to the current magnetic part of a watthour meter. In molding operations wherein the molding material is introduced into the mold cavity under substantial pressure it has been observed that portions of the windings within the cavity have been displaced from their proper spaced positions under the influence of such pressures. Such displacements has resulted in actual contact between portions of the windings, or positioning of the winding portions in such close proximity that the insulation therebetween provided by the molding material is insufficient to prevent an insulation breakdown under energized conditions of the windings. This problem has proved to be particularly troublesome in connection with the molding of windings having the configuration of the windings 39 and 40.

It will be recalled in connection with Figs. 1 and 2 that when the windings 39 and 40 are operatively positioned with respect to the part 7 the winding portions 43, 44, 55 and 56 are located in the space between the poles 19 and 21 in spaced parallel relation. It is desirable that proper spacing of these winding portions be maintained during the molding operation to prevent an insulation breakdown of the molded assembly under operating conditions of the meter. It is further desirable to maintain the symmetrical positioning of these winding portions relative to the axis 66.

According to the present invention the winding portions located in the space between the current poles are supported against displacement during the molding operation. For this purpose the invention provides an insulating spaced device of one-part construction which is conveniently applied to the winding portions located between the current poles prior to the molding operation. Details of a preferred construction of the spacer are shown in Figs. 3 and 4.

As there shown, a spacer 145 is provided in the form of an insulating body constructed of a suitable insulating material. The spacer is preferably constructed of the same material which is employed as the insulating molding material described hereinafter. The spacer 145 is illustrated as including four spaced parallel openings 146, 147, 148 and 149 of circular configuration extending entirely through the spacer proportioned to snugly receive respectively the winding portions 43, 44, 56 and 55. In order to facilitate the installation of the spacer relative to the winding portions the spacer is formed with a plurality of peripheral slots 146a, 147a, 148a and 149a each extending parallel to and communicating with a separate one of the openings. The slots and openings define flexible parts or wings 150, 151, 152 and 153 of the spacer which provide a restricted condition of the slots wherein the widths of the slots are less than the diameters of the openings when the wings are in an unflexed condition. The wings may be flexed to increase the widths of the slots from the restricted condition for permitting passage of the winding portions through the slots into the openings. When the winding portions are located within the openings the wings assume an unflexed condition to thereby prevent accidental detachment of the spacer relative to the winding portions during the molding operation.

The spacer 145 is conveniently installed relative to the winding portions 43, 44, 55 and 56 prior to the assembly of the windings relative to the current part 7. The assembly including the windings and installed spacer may then be positioned as a unit in the proper position relative to the part 7. If this method of installation is employed the spacer and windings are proportioned such that the windings with the spacer attached may readily be passed over the current poles 19 and 21 into an operative position relative to the part 7. If desired the spacer may be attached to the winding parts 43, 44, 55 and 56 subsequent to the assembly of the windings relative to the part 7.

The operations required to mold the current windings to the current part 7 may now be described. The windings 39 and 40 and the spacer 145 are assembled relative to the current part 7 in the manner previously described. The entire assembly including the windings, spacer and part 7 is then positioned relative to the lower mold part 77 as illustrated in Figs. 4 and 5. As there shown, the current part 7 is positioned to engage the base surface 79 in a plane parallel to the plane of the surface 79 such that the leg portions 86 and 87 extend respectively between the pole 19 and the arm 17a and between the pole 21 and the arm 17b. The enlarged terminal portions of the current poles are positioned in the cavity 84 with the pole faces 23 and 25 in engagement with the side wall 85. The winding 39 is then adjusted such that the portions 46 and 48 are located respectively in the slots of the pins 99 and 103, and such that the portions 51a and 49a are positioned within the grooves 89 and 91 respectively. In a similar manner, the winding 40 is adjusted such that the portions 58 and 61 are positioned respectively within the slots of the pins 97 and 101, and such that the portions 62a and 64a are located respectively in the grooves 93 and 95. The windings 39 and 40 are further adjusted to position the portions 43, 44, 55 and 56 symmetrically relative to the axis 66 of the part 7. With such arrangement, the portions of the windings which are intermediate the associated terminals are located within the cavity 82 of the section 81.

The mold parts 75 and 77 are initially positioned in alignment along a line extending transverse to the surfaces 79 and 113 of the mold parts. In order to effect closing of the mold assembly the upper mold part 75 is moved relative to the lower mold part 77 along the line of alignment in the direction of the arrow 154 shown in Figs. 7 and 8 until the part 75 engages an end lamination of the part 7. The mold assembly is shown in Figs. 7 and 8 in the closed condition to permit the molding operation. It is observed that in such condition the upper mold part 75 is positioned with the portion 131 within the cavity 84 in engagement with a part of an end lamination of the current part 7. The portion 133 of the mold part 75 engages an additional part of this end lamination.

The leg portions 119 and 121 of the mold part 75 engage respectively the leg portions 86 and 87 of the mold part 77 such that the grooves 123 and 125 form respectively with the grooves 91 and 89 spaced openings for receiving the portions 49a and 51a of the winding 39, and the grooves 127 and 129 form with the grooves 95 and 93 spaced openings for receiving the portions 64a and 62a of the winding 40. The pins 126 and 128 engage respectively the portions 49 and 62 of the windings 39 and 40 to assist in maintaining the windings in operative positions. It is observed that the plane of engagement of the mold parts 75 and 77 is spaced from and parallel to the plane of the current part 7 to intersect the connecting portions 51a, 49a, 62a and 64a of the windings. With this arrangement the mold parts close on such connecting portions at points thereof which are included in lines extending transverse to the plane of the part 7 intermediate the pole 19 and the arm 17a and the pole 21 and the arm 17b.

When the mold assembly is in a closed condition as shown in Figs. 7 and 8, a suitable molding material 159 may be introduced into the composite mold cavity through the opening 143 in any suitable manner. For example, the molding material 159 may be contained in a tank 155 having a nozzle 157 communicating with the opening 143. The molding material 159 may be transferred from the tank 155 to the mold cavity by actuation of a suitable plunger 161 which is mounted for reciprocation in the direction of the double headed arrow 162.

Any suitable insulating material may be employed in the molding operation. Preferably, the material 159 comprises a polyester resin which is injected into the mold cavity from the tank 155 in a fluid condition under suitable heat and pressure conditions. When the fluid material entirely fills the mold cavity, it completely surrounds portions of the windings which are intermediate the coil terminal portions to engage portions of the current part 7. The fluid material also surrounds completely the spacer 145 filling the slots 146a, 147a, 148a and 149a. The injected fluid material coalesces with the spacer 145 to provide a homogeneous insulating casing. Subsequent to introduction of the material 159 into the mold cavity, it is allowed to attain a solid state at which time the mold parts 75 and 77 may be separated to expose the assembled electromagnetic structure.

Although the invention has been described with reference to certain specific embodiments thereof, numerous modifications are possible, and it is desired to cover all modifications falling within the spirit and scope of the invention.

We claim as our invention:

1. In an electroresponsive device, a magnetic structure having a pair of spaced parallel pole pieces lying in a common first plane, winding means for the pole pieces including a plurality of spaced conductors extending along lines passing through the space between said pole pieces in directions substantially transverse to said first plane, said conductors being spaced in the direction of spacing of said pole pieces, and a spacer device for maintaining the spacing of said conductors, said spacer device comprising a body having a plurality of spaced openings extending therethrough, each of said openings communicating with the peripheral surface of the body in a direction transverse to the direction of extension of said openings, said spacer device being positioned substantially entirely in the space between said pole pieces with each of said conductors extending through a separate one of said openings, said spacer device being supported solely by said conductors in spaced relation with said magnetic structure.

2. In an electroresponsive device, a magnetic structure having a pair of spaced parallel pole pieces lying in a common first plane, winding means for the pole pieces including a plurality of spaced conductors extending along lines passing through the space between said pole pieces in directions substantially transverse to said first plane, said conductors being spaced in the direction of spacing of said pole pieces, a spacer device for maintaining the spacing of said conductors, said spacer device comprising a body formed of an insulating material having a plurality of spaced openings extending therethrough, each of said openings communicating with the peripheral surface of the body in a direction transverse to the direction of extension of said openings, said spacer device being positioned substantially entirely in the space between said pole pieces with each of said conductors extending through a separate one of said openings, said spacer device being supported solely by said conductors in spaced relation with said magnetic structure, and an insulating casing molded about said conductors in intimate engagement with the spacer device to completely embed said spacer device, said casing being formed of the same insulating material employed for said spacer device.

3. In an electroresponsive device, a magnetic structure having a pair of spaced parallel pole pieces lying in a common first plane, a pair of windings for the pole pieces, each of said windings comprising a self-supporting electroconductive bare wire having a pair of spaced terminals, the wire between the terminals being deformed to provide windings of figure-of-eight configuration each having a pair of loops lying in a common second plane, the loops of each winding being connected by a pair of spaced parallel winding portions lying in said plane, one of said windings being positioned with each of its loops surrounding a separate one of said pole pieces to have its winding portions spaced in the direction of spacing of said pole pieces and extending along lines which pass through the space between said pole pieces in directions substantially transverse to said first plane, the other of the windings being positioned with each of its loops surrounding a separate one of said pole pieces to have its winding portions spaced in the direction of spacing of said pole pieces and extending along lines which pass through the space between said pole pieces in directions substantially transverse to said first plane, said windings being positioned further with said second planes spaced in a direction extending transverse to the direction of spacing of said pole pieces, a spacer device for maintaining the spacing of said winding portions, said spacer device comprising an insulating body in engagement with and supported solely by said winding portions to prevent relative displacement between said winding portions, said spacer device being positioned substantially entirely in the space between said pole pieces in spaced relation with the magnetic structure with the material of said body in the spaces between said winding portions, and an insulating casing molded about said windings to completely embed said loops and said spacer device.

4. In an electroresponsive device, a magnetic structure having a pair of spaced parallel pole pieces lying in a common first plane, a pair of windings for the pole pieces, each of said windings comprising a self-supporting electroconductive bare wire having a pair of spaced terminals, the wire between the terminals being deformed to provide windings of figure-of-eight configuration each having a pair of loops lying in a common second plane, the loops of each winding being connected by a pair of spaced parallel winding portions lying in said plane, one of said windings being positioned with each of its loops surrounding a separate one of said pole pieces to have its winding portions spaced in the direction of spacing of said pole pieces and extending along lines which pass through the space between said pole pieces in directions substantially transverse to said first plane, the other of the windings being positioned with each of its loops surrounding a separate one of said pole pieces to have its winding portions spaced in the direction of spacing of said pole pieces and extending along lines which pass through the space between said pole pieces in directions substantially transverse to said first plane, said windings being positioned further with said second planes spaced in a direction extending transverse to the direction of spacing of said pole pieces, a spacer device for maintaining the spacing of said winding portions, said spacer device comprising an insulating body having a plurality of spaced parallel openings extending therethrough, said body having further a plurality of peripheral slots each extending parallel to and communicating with a separate one of said openings, said openings and slots providing a plurality of flexible wings of said body, said spacer device being positioned with each of said winding portions extending through a separate one of said openings, said winding portions being displaceable from said openings only in response to flexure of said flexible wings, and an insulating casing molded about said windings to completely embed said loops and said spacer device.

5. In an electroresponsive device, a magnetic structure having a pair of spaced parallel pole pieces lying in a common first plane, a pair of windings for the pole pieces, each of said windings comprising a self-supporting electroconductive bare wire having a pair of spaced terminals, the wire between the terminals being deformed to provide windings of figure-of-eight configuration each having a pair of loops lying in a common second plane, the loops of each winding being connected by a pair of spaced parallel winding portions lying in said plane, one of said windings being positioned with each of its loops surrounding a separate one of said pole pieces to have its winding portions spaced in the direction of spacing of said pole pieces and extending along lines which pass through the space between said pole pieces in directions substantially transverse to said first plane, the other of the windings being positioned with each of its loops surrounding a separate one of said pole pieces to have its winding portions spaced in the direction of spacing of said pole pieces and extending along lines which pass through the space between said pole pieces in directions substantially transverse to said first plane, said windings being positioned further with said second planes spaced in a direction extending transverse to the direction of spacing of said pole pieces, a spacer device for maintaining the spacing of said winding portions, said spacer device comprising an insulating body in engagement with and supported solely by said winding portions to prevent relative displacement between said winding portions, and an insulating casing molded about said windings to completely embed said loops and said spacer device, said casing being formed of the same insulating material employed for said spacer device.

6. In an electroresponsive device, a magnetic structure having a pair of spaced parallel pole pieces lying in a common plane, a pair of windings for the pole pieces, each of said windings comprising a self-supporting electroconductive bare wire having a pair of spaced terminals, the wire between the terminals being deformed to provide windings of figure-of-eight configuration each having a pair of loops, the loops of each winding being connected by a pair of spaced parallel winding portions, one of said windings being positioned with each of its loops surrounding a separate one of said pole pieces to have its winding portions extending along lines which pass through the space between said pole pieces in directions substantially transverse to said common plane, the other of the windings being positioned with each of its loops surrounding a separate one of said pole pieces to have its winding portions extending along lines which pass through the space between said pole pieces in directions substantially transverse to said common plane, said pole pieces being symmetrically arranged relative to an axis passing therebetween transverse to said lines and transverse to the direction of spacing of said pole pieces, a separate pair of said winding portions being located at each side of said axis with the winding portions symmetrical with said axis, and a spacer device for maintaining the spacing and symmetrical arrangement of said winding portions, said spacer device comprising an insulating body in engagement with and supported solely by said winding portions to prevent relative displacement between said winding portions, said winding portions being spaced from one another by the material of said body.

References Cited in the file of this patent

UNITED STATES PATENTS

| | | |
|---|---|---|
| 1,089,642 | Honold | Mar. 10, 1914 |
| 1,236,357 | Reeve | Aug. 7, 1917 |
| 1,856,109 | Murray | May 3, 1932 |
| 2,064,772 | Vogt | Dec. 15, 1936 |
| 2,656,512 | Lenehan | Oct. 20, 1953 |
| 2,683,578 | Rainey | July 13, 1954 |
| 2,724,869 | Merrill | Nov. 29, 1955 |

FOREIGN PATENTS

| | | |
|---|---|---|
| 599,050 | Great Britain | Mar. 3, 1948 |